US010755717B2

(12) United States Patent
Werner et al.

(10) Patent No.: US 10,755,717 B2
(45) Date of Patent: Aug. 25, 2020

(54) PROVIDING REMINDERS BASED ON VOICE RECOGNITION

(71) Applicant: INTERNATIONAL BUSINESS MACHINES CORPORATION, Armonk, NY (US)

(72) Inventors: John S. Werner, Fishkill, NY (US); Sneha M. Varghese, Fishkill, NY (US); Sarah Wu, Kingston, NY (US); Kavita Sehgal, Poughkeepsie, NY (US); Diane M. Stamboni, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 15/976,039

(22) Filed: May 10, 2018

(65) Prior Publication Data
US 2019/0348048 A1    Nov. 14, 2019

(51) Int. Cl.
*G10L 17/00* (2013.01)
*G06Q 10/10* (2012.01)
*G06F 16/683* (2019.01)

(52) U.S. Cl.
CPC .......... *G10L 17/005* (2013.01); *G06F 16/683* (2019.01); *G06Q 10/109* (2013.01)

(58) Field of Classification Search
CPC .... G10L 17/005; G06F 16/683; G06Q 10/109
See application file for complete search history.

(56) References Cited

U.S. PATENT DOCUMENTS

| 6,584,180 | B2 | 6/2003 | Nemoto | |
|---|---|---|---|---|
| 7,577,522 | B2 | 8/2009 | Rosenberg | |
| 7,991,128 | B2 * | 8/2011 | Abernethy, Jr. | H04L 67/28 370/352 |
| 8,139,754 | B2 | 3/2012 | Aghara et al. | |
| 8,537,003 | B2 | 9/2013 | Khachaturov et al. | |
| 9,014,347 | B2 | 4/2015 | Moore et al. | |
| 2002/0145521 | A1 * | 10/2002 | Chou | G08B 23/00 340/573.1 |
| 2006/0184508 | A1 * | 8/2006 | Fuselier | G06Q 10/06 |
| 2006/0188075 | A1 * | 8/2006 | Peterson | H04M 3/5191 379/67.1 |

(Continued)

OTHER PUBLICATIONS

Moriyama, Satoshi "Poster: Creation of a Co-Located Mobile-phone Users Group Using Voice", MobiSys'16 Companion, Jun. 25-30, 2016, pp. 64.
Stahl, Christoph "Maintaining multiple sclerosis patients' quality of life—a case study on environment control assistance in a smart home", PETRA '17, Jun. 21-23, 2017, pp. 83-86.

(Continued)

*Primary Examiner* — Fariba Sirjani
(74) *Attorney, Agent, or Firm* — Cantor Colburn LLP; Teddi Maranzano

(57) ABSTRACT

Methods, systems, and computer program products for providing reminders to users based on voice recognition are provided. Aspects include monitoring, via a microphone of a user device, a communication of a user. Aspects also include determining an identity of a person communicating with the user based on a voice signature of the person. Aspects further include providing a notification to the user based on a determination that the user has a reminder event for the person.

18 Claims, 7 Drawing Sheets

700

(56) References Cited

U.S. PATENT DOCUMENTS

| | | | |
|---|---|---|---|
| 2011/0091020 A1 | 4/2011 | Aghara et al. | |
| 2014/0123007 A1* | 5/2014 | Williams | H04L 51/04 715/716 |
| 2014/0172953 A1* | 6/2014 | Blanksteen | H04L 67/22 709/203 |
| 2014/0330566 A1 | 11/2014 | Redfern | |
| 2015/0064666 A1* | 3/2015 | Song | G09B 5/14 434/185 |
| 2015/0156268 A1* | 6/2015 | Lev | H04L 51/32 709/204 |
| 2016/0164813 A1* | 6/2016 | Anderson | H04L 51/046 709/206 |
| 2017/0084295 A1* | 3/2017 | Tsiartas | G10L 25/63 |
| 2017/0094947 A1* | 4/2017 | Greer | A01K 29/005 |
| 2017/0180499 A1* | 6/2017 | Gelfenbeyn | H04L 67/26 |
| 2018/0097753 A1* | 4/2018 | Gill | H04L 67/306 |
| 2018/0367484 A1* | 12/2018 | Rodriguez | G06Q 10/101 |
| 2019/0129938 A1* | 5/2019 | Yao | G06F 3/167 |

OTHER PUBLICATIONS

Zhang, Linghan "VoiceLive: A Phoneme Localization based Liveness Detection for Voice Authentication on Smartphones" CCS'16, Oct. 24-28, 2016, pp. 1080-1091.

Gong, Neil Zhenqiang "PIANO: Proximity-based User Authentication on Voice-Powered Internet-of-Things Devices", retrieved https://arxiv.org/pdf/1704.03118.pdf; dated Apr. 11, 2017; 8 pgs.

Jonsson, H. et al. "Proximity-based reminders using Bluetooth", Abstract Only—IEEE Xplore Digital Library; retrieved at: https://ieeexplore.ieee.org/document/6815184; Published in: 2014 IEEE Int'l Conf. on Pervasive Computing and Communication Workshops; Date of Conference: Mar. 24-28, 2014; 1 pg.

* cited by examiner

PROVIDING REMINDERS BASED ON VOICE RECOGNITION

BACKGROUND

The invention relates generally to providing reminders and, more specifically, to providing reminders to users based on voice recognition.

People are increasingly relying on electronic device for reminders of various activities. Currently available systems allow people to set reminders that will provide notifications based on either a current time being equal to a predetermined time or current location being equal to a predetermined location.

SUMMARY

According to an embodiment, a system for providing reminders based on voice recognition is provided. The system includes a memory having computer readable computer instructions, and a processor for executing the computer readable instructions. The computer readable instructions include monitoring, via a microphone of a user device, a communication of a user. The computer readable instructions also include determining an identity of a person communicating with the user based on a voice signature of the person. The computer readable instructions further include providing a notification to the user based on a determination that the user has a reminder event for the person.

According to another embodiment, a method providing reminders based on voice recognition is provided. The method includes monitoring, via a microphone of a user device, a communication of a user. The method also includes determining an identity of a person communicating with the user based on a voice signature of the person. The method further includes providing a notification to the user based on a determination that the user has a reminder event for the person.

According to a further embodiment, a computer program product is provided. The computer program product includes a computer readable storage medium having program instructions embodied therewith. The computer readable storage medium is not a transitory signal per se. The program instructions are executable by a computer processor to cause the computer processor to perform a method. The method includes monitoring, via a microphone of a user device, a communication of a user. The method also includes determining an identity of a person communicating with the user based on a voice signature of the person. The method further includes providing a notification to the user based on a determination that the user has a reminder event for the person.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, in which:

DETAILED DESCRIPTION

Figure 1:
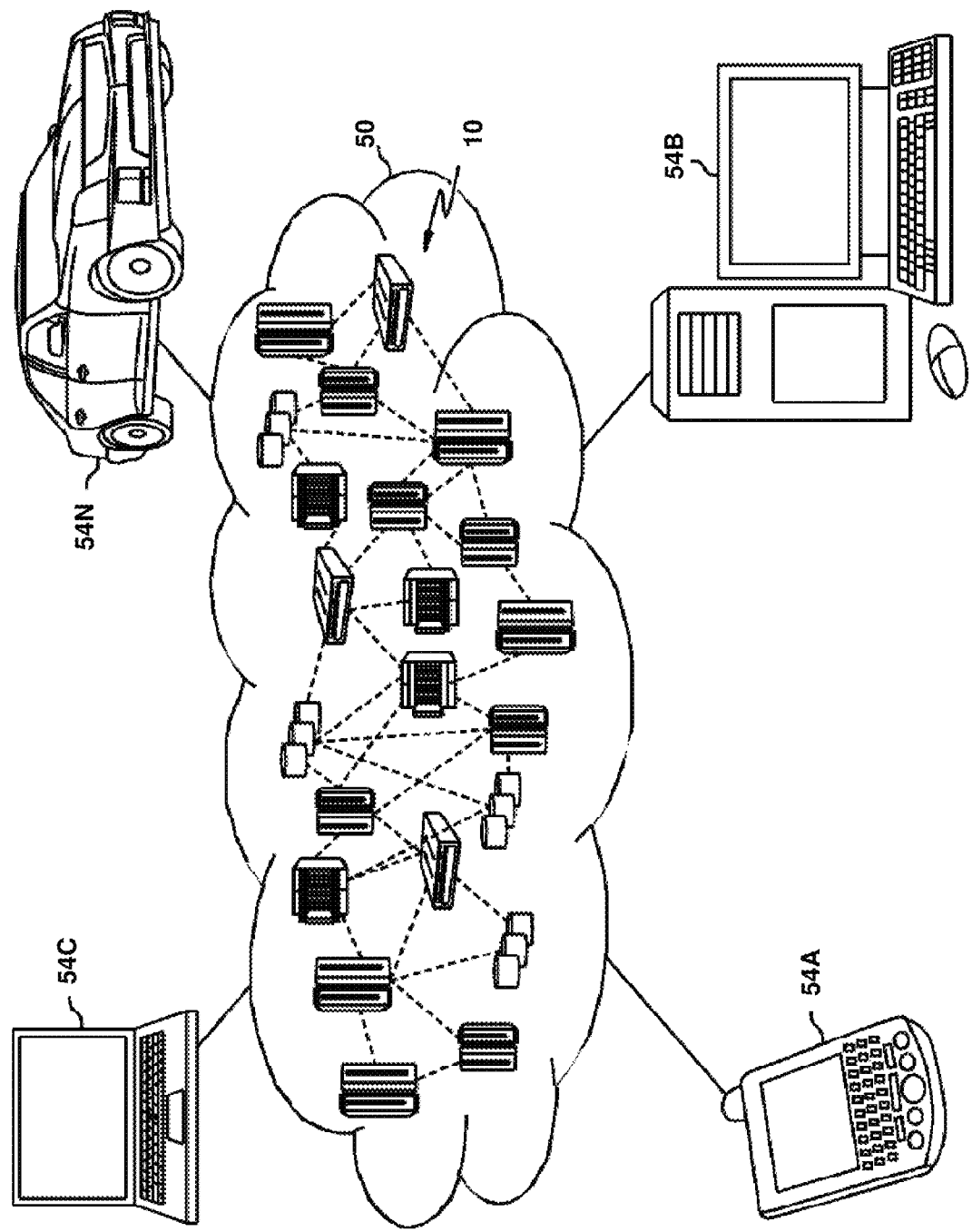
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
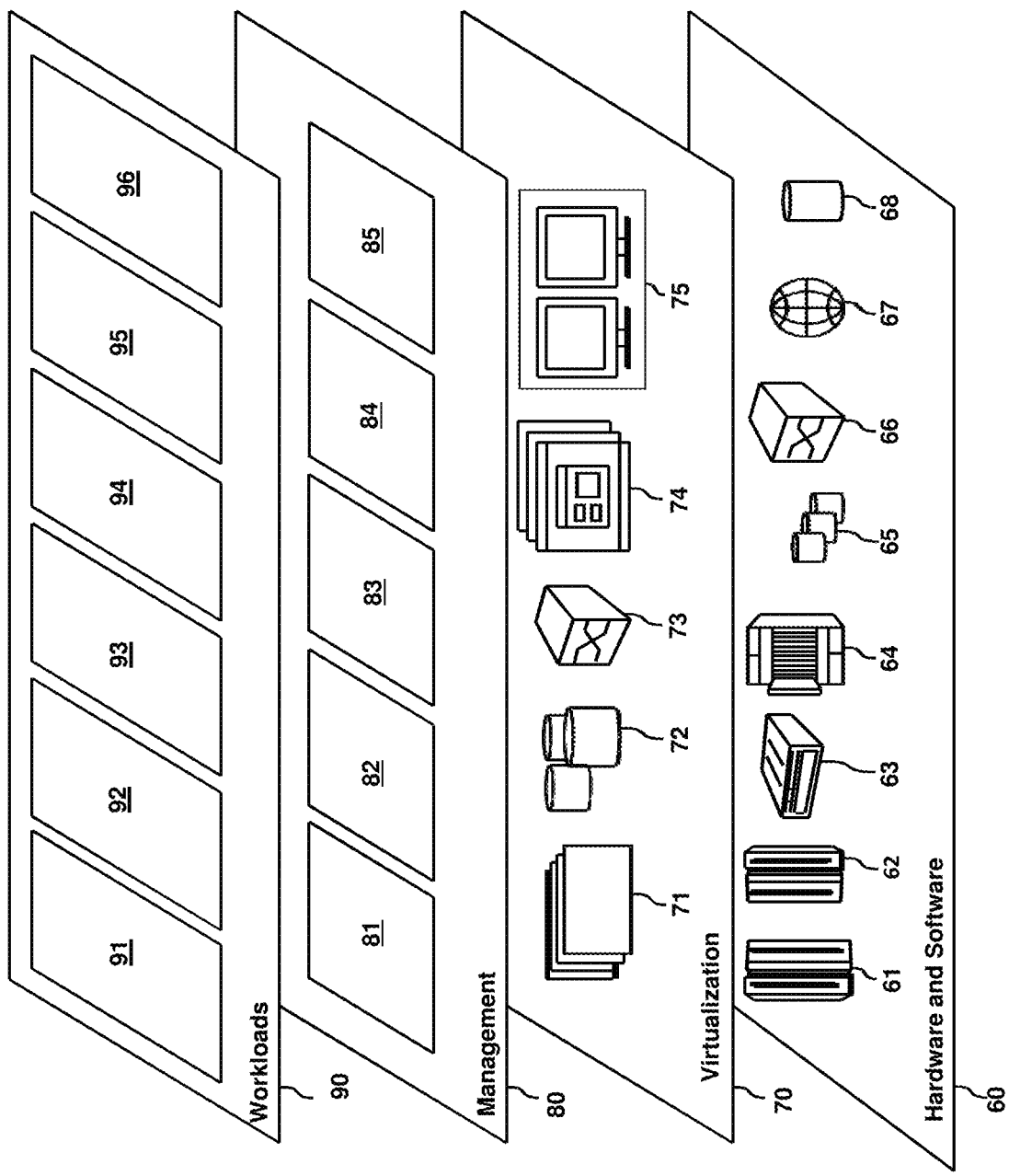
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing reminders based on voice recognition 96.

Figure 3:
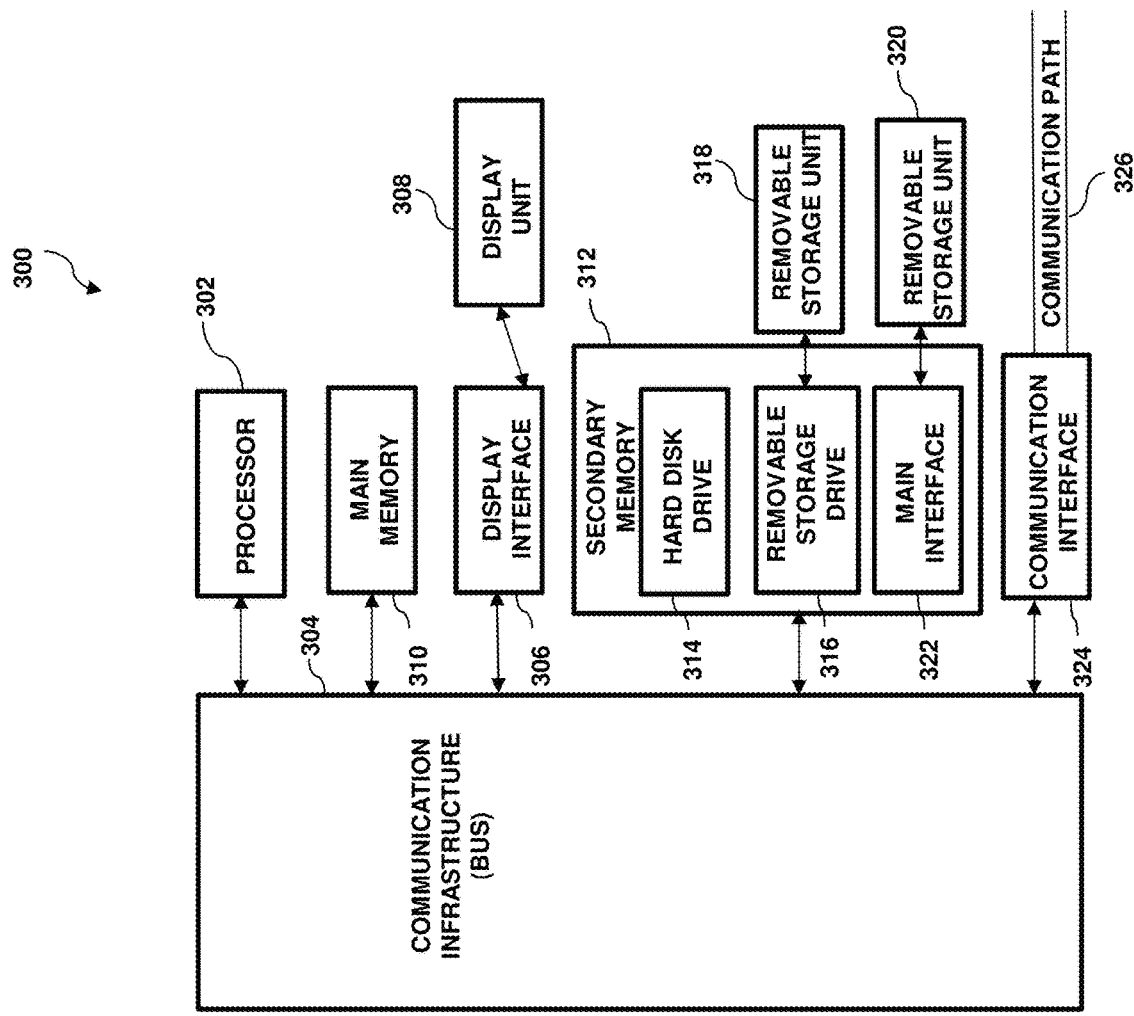
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for providing reminders to a user based on voice recognition is configured to monitor the communications of a user and to provide a reminder to the user based on a determination that that the user is communicating with a specific individual. In exemplary embodiments, a user requests that a reminder be provided to them when it is determined that they are communicating with a specific individual. The request can include multiple additional criteria that must be met for the reminder, or notification, to be provided. Once the reminder has been requested, the system monitors the communication of the user and obtains voice samples from individuals that the user communicates with. These voice samples are compared to stored voice signatures of known individuals and based on a detected match between the voice sample collected and the stored voice signature of the desired individual, a notification is provided to the user.

Figure 4:
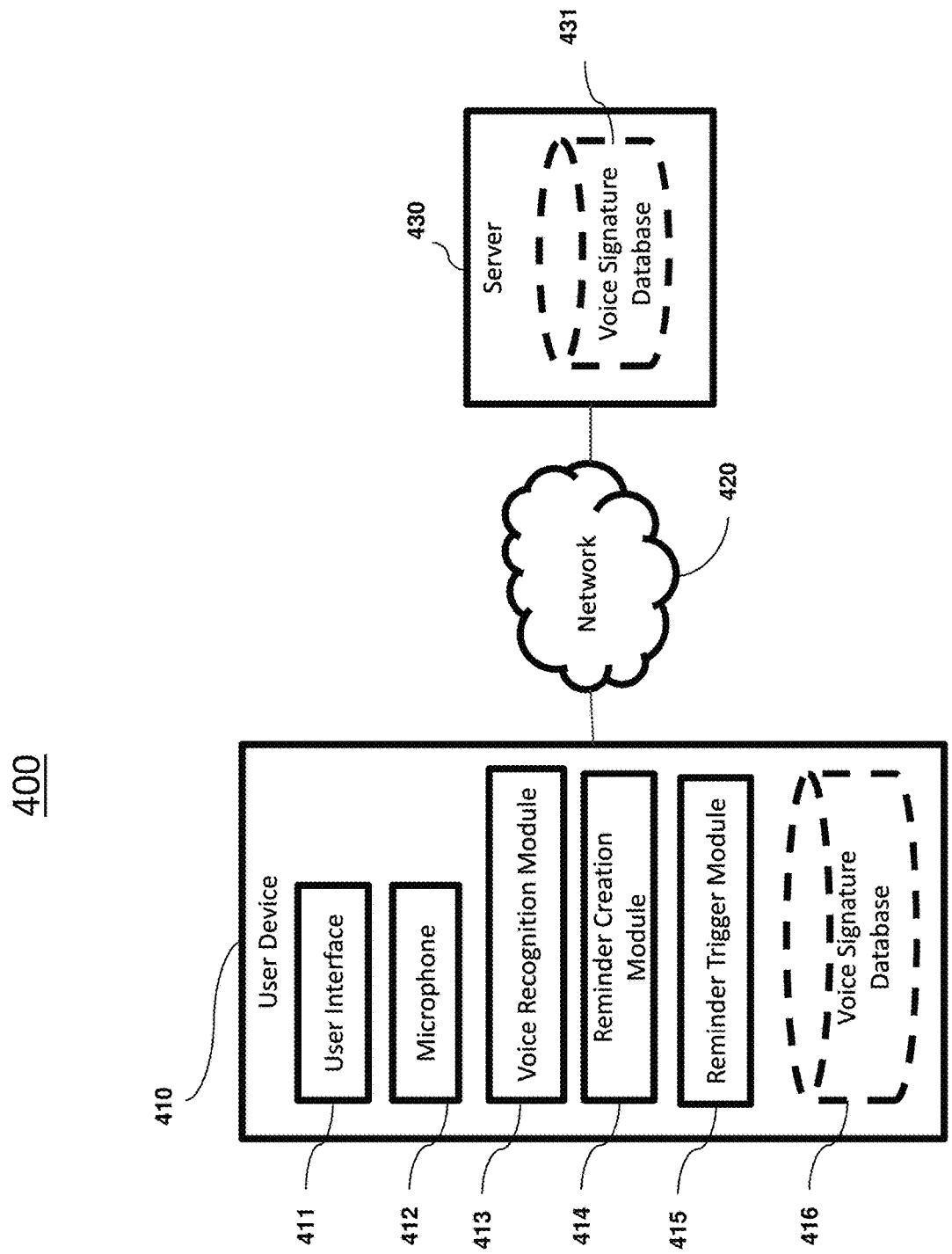
FIG. 4 depicts a system for providing reminders based on voice recognition according to one or more embodiments of the present invention.

Turning now to FIG. 4, a system 400 upon which providing reminders to users based on voice recognition may be implemented will now be described in accordance with an embodiment. The system 400 shown in FIG. 4 includes a server 430 in communication with a user device 410 via a communications network 420. The communications network 420 may be one or more of, or a combination of, public (e.g., Internet), private (e.g., local area network, wide area network, virtual private network), and may include wireless and wireline transmission systems (e.g., satellite, cellular network, terrestrial networks, etc.).

In exemplary embodiments, the user device 410 can be a smartphone, a tablet, a computer system such as the one shown in FIG. 3, a smart speaker, a television, or any other suitable electronic device. The user device 410 includes a user interface 411, a microphone 412, a voice recognition module 413, a reminder creation module 414, a reminder trigger module 415, and optionally a voice signature database 416. The user interface 411 can be a graphical user interface such a touchscreen, a keyboard, or the like that can be used to create reminders and on which notifications can be displayed. In exemplary embodiments, the microphone 412 is configured to capture the communications of the user. These communications can be face-to-face conversations or electronic communications, such as telephone calls using the user device 410.

In exemplary embodiments, the voice recognition module 413 is configured to receive voice samples from the microphone 412 and to compare the voice samples to voice signatures obtained from the voice signature database 416, 431 to identify an individual that is speaking. As illustrated, the voice signatures of individuals can be stored on the user device 410 and/or the server 430. In exemplary embodiments, the voice signature database 416 may be configured to only store the voice signatures of individuals for which the user of the user device 410 has outstanding reminders. In contrast, the voice signature database 431 may be configured to store the voice signatures of all of the contacts of the user of user device 410. Accordingly, when the user creates a reminder for an individual, the user device 410 may obtain a voice signature for the individual from the voice signature database 431 and store it in the voice signature database 416. Server 430 may alternatively be hosted by a third-party app such that voice signatures on database 431 are shared with permissions granted only to certain users (e.g., if user 1 and user 2 are both friends with user 3, the app only need to store user 3's voice signature on database 431 once. Users 1 and 2 would have permission to access user 3's voice signature, but user 4 would not).

In exemplary embodiments, voice signatures may be voluntarily shared between individual. In one embodiment, voice signatures may be obtained via a user's social media friends or followers or an internal database that is kept by an employer and is used for work reminders. In exemplary embodiments, since the user device 410 is always recording, it may be configured to store short audio clips in a temporary memory of unrecognized voices heard throughout the day and allow users to define who the voice belongs to later on such that it can be stored to database 416, 431.

The reminder creation module 414 is configured to create reminder events for the user. In various embodiments, the reminder creation module 414 can utilize the user interface 411 to receive reminder events, as discussed in more detail with reference to FIG. 5, or it can use the microphone 412 to capture user requests for reminders. For example, if the microphone 412 detects the user say, "set a reminder to give Sam a check next time I see him" the reminder creation module 414 can create a reminder event for the next time the user has a face-to-face conversation and Sam's voice is detected.

The reminder trigger module 415 is configured to create notifications based on determining that the criteria for a reminder event has been satisfied. The criteria for the reminder event includes that the user is communicating, either in person or electronically, with the specified individual and can also include the presence or absence of one or more additional individuals, the user's location, a date/time, or the like. In exemplary embodiments, the reminder trigger module 415 confirms that all of the criteria for the reminder event have been satisfied and provides a notification to the user. In addition, the manner in which the reminder trigger module 415 provides the notification can be determined based on the reminder event.

Figure 5:
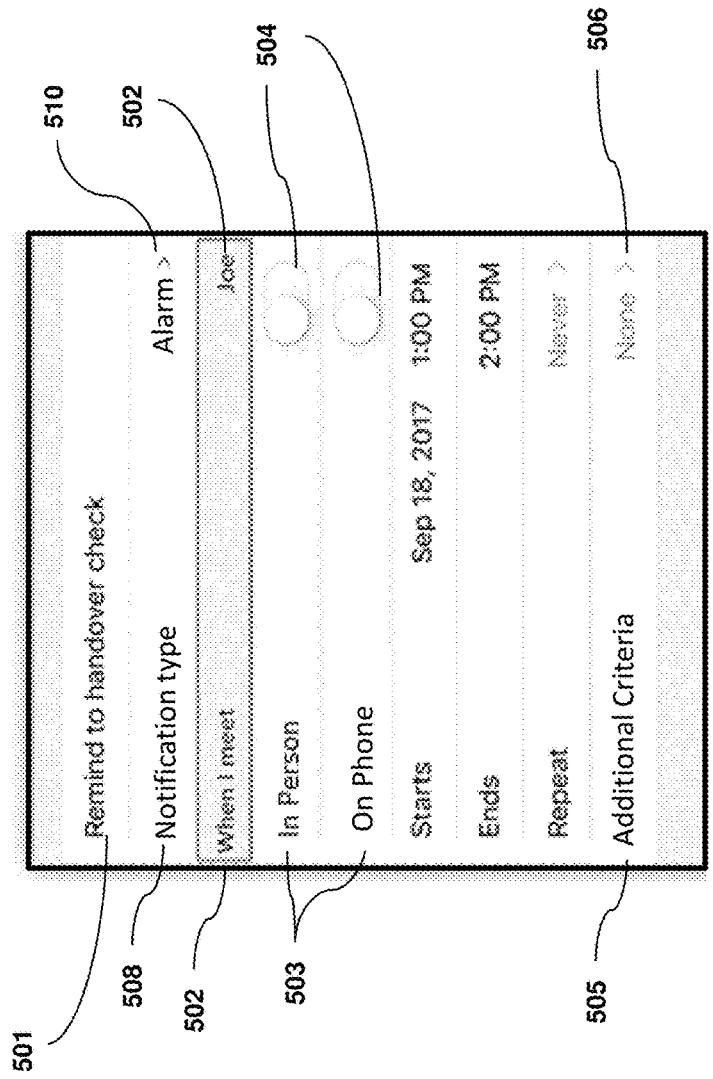
FIG. 5 depicts a user interface for setting a reminder based on voice recognition according to one or more embodiments of the present invention.

Referring now to FIG. 5, a user interface 500 for setting a reminder based on voice recognition according to one or more embodiments is shown. As illustrated, the user interface 500 can be used to set a reminder event having a title 501, an identity of an individual 502, one or more communication types 503, selection icons 504, an additional criteria indicator 505 and an additional criteria menu 506. In exemplary embodiments, the user interface 500 receives the reminder event information from the user and provides it to the reminder creation module. The user interface 500 can include additional information such as desired notification type 508 and a notification type selection icon 510.

Figure 6:
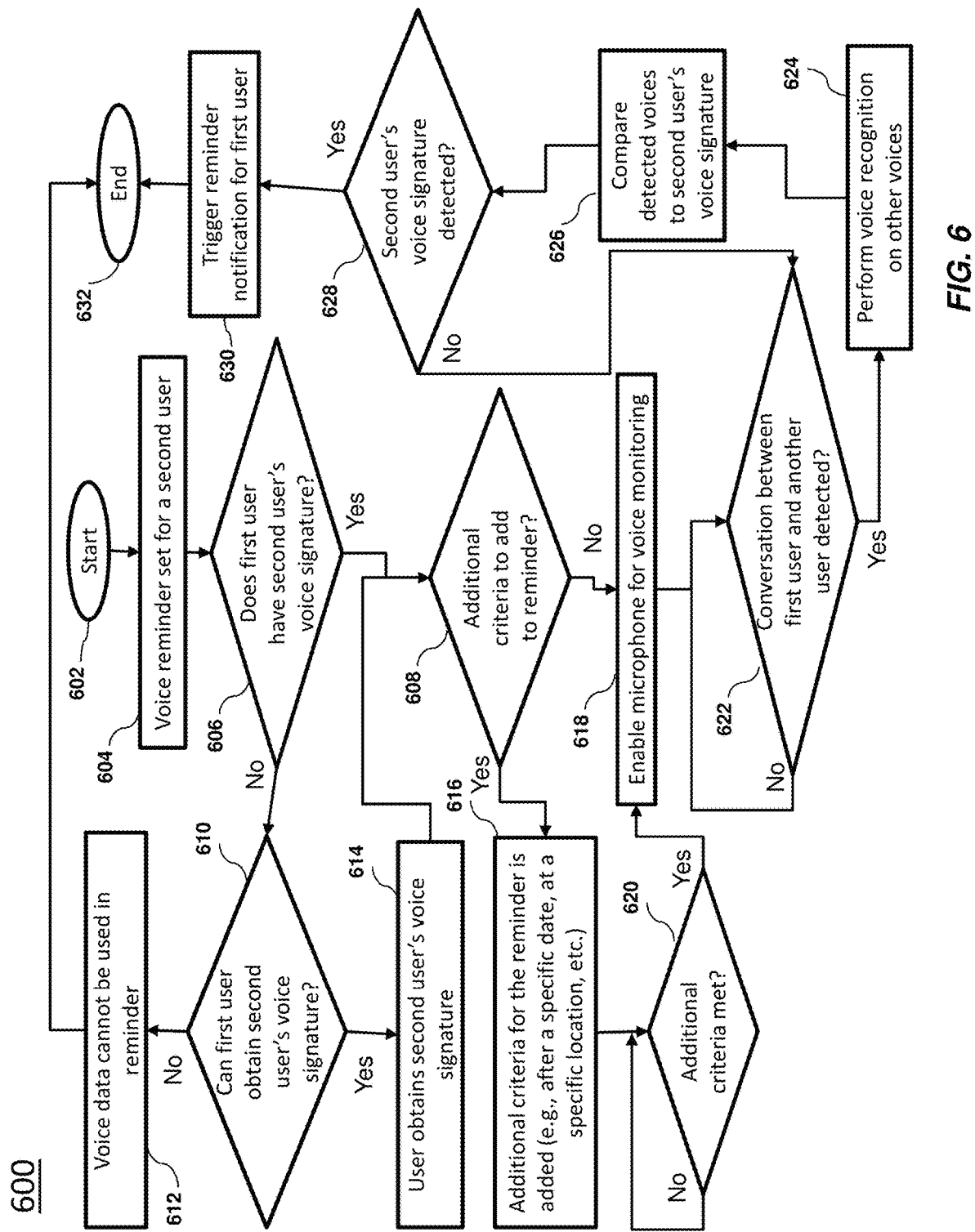
FIG. 6 depicts a flow diagram of a method for providing reminders based on voice recognition according to one or more embodiments of the present invention.

Turning now to FIG. 6, a flow diagram of a method 600 for providing reminders based on voice recognition in accordance with an embodiment is shown. The method 600 begins at block 602 and a voice reminder for a second user is created, as shown at block 604. Next, as shown at decision block 606, the method 600 includes determining if the first user has the voice signature of the second user. If the first user has the voice signature of the second user on voice signature database 416 or 431, the method 600 proceeds to decision block 608 and determines if any additional criteria are to be added to the reminder. If the first user does not have the voice signature of the second user, the method 600 proceeds to decision block 610 and determines if the first user can obtain the voice signature of the second user. If the first user cannot obtain the voice signature of the second user, the method 600 proceeds to block 612 and indicates to the first user that voice data cannot be used in providing the reminder. The method 600 then ends, as shown at block 632. If the first user can obtain the voice signature of the second user, the method 600 proceeds to block 614 and the first user obtains the voice signature of the second user. The user may obtain the voice signature by requesting access to said voice signature on database 431 (i.e., similar to sending out a friend request on a social media platform) or they may upload an audio file received from the second user or recorded by the first user or second user. As shown at block 616, the method 600 includes adding any additional criteria for the reminder to the reminder event. Additional criteria may include not generating the reminder before a specified date or only generating the reminder when in a certain location. Next, the method 600 includes determining if the additional criteria has been met, as shown at decision block 620. Once the additional criteria has been met, the method 600 proceeds to block 618.

Continuing with reference to FIG. 6, as shown at block 618, the method 600 includes enabling the microphone of a device of the first user for voice monitoring. Next, as shown at decision block 622, it is determined if the first user is detected talking to another user. If so, the method 600 proceeds to block 624 and performs voice recognition on the voices detected in the conversation. Next, as shown at block 626, the method 600 includes comparing the detected voices to the voice signature of the second user. If, as determined at decision block 628, the voice signature of the second user matches the voice captured from the conversation, the method proceeds to block 630 and a notification for the reminder event is provided to the first user. Otherwise, the method 600 returns to decision block 622.

In another embodiment, the determination that the desired additional criteria are met can be performed after the determination that the voice signature of the second user matches the voice captured from the conversation, rather than prior to enabling the microphone for voice monitoring. This may be useful in embodiments where the additional criteria is the desired presence or absence of one or more third parties. For example, a husband may want a reminder to tell his wife about an idea for a birthday present for a child but would not want that reminder when the child is present. In another embodiment, a boss may want a reminder to discuss a sensitive issue with an employee but may only want that reminder when there are no other individuals present. In exemplary embodiments, reminder events may use logical operations (e.g., AND, OR) to trigger a reminder notification.

Additional criteria may be added to a reminder event that works in conjunction with the voice recognition module. For example, a first user may want to give a second user a check, but the first user may want to set the start date for that reminder event to be after the first user receives their paycheck. In this example, if the first user were to converse with the second user prior to the start date, the reminder notification would not be provided to the user. Additional criteria may also include, but is not limited to, an end date, a location, an event trigger, etc.

In exemplary embodiments, a reminder event may be set to recognize the presence of a group of second users, wherein a threshold number of second users whose voice signatures are detected within a duration of time will trigger a reminder. For example, a first user, such as a coach or teacher, may want to be reminded to tell their class or team about an upcoming event, such as a party or a test, but only wants to be reminded when at least a certain number of students are present.

Figure 7:
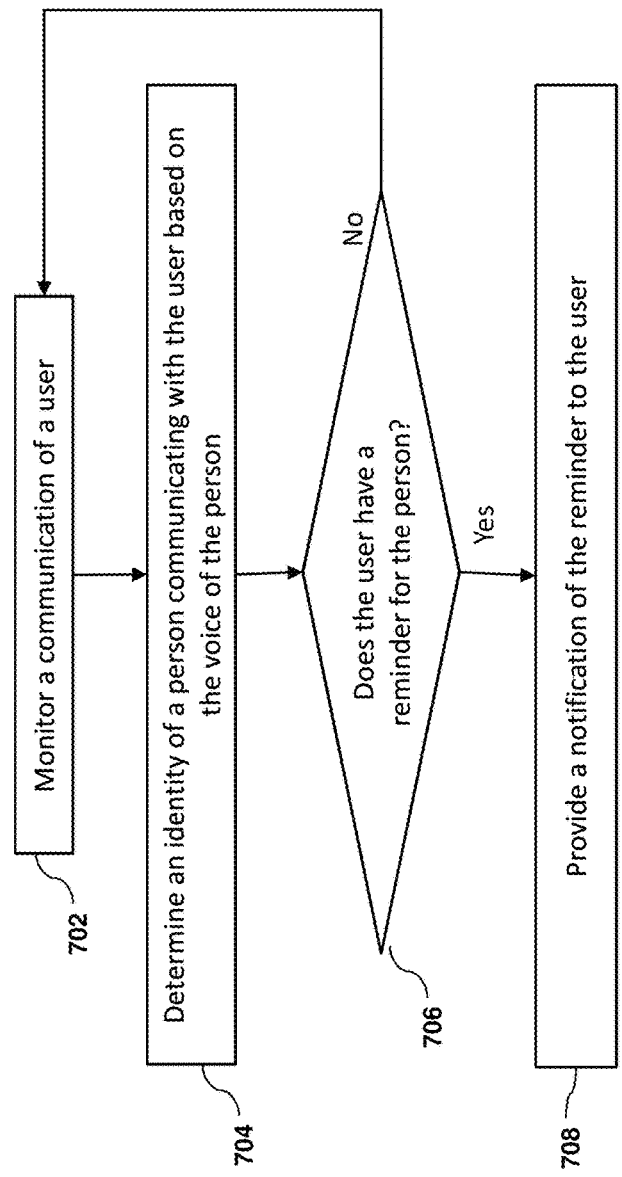
FIG. 7 depicts a flow diagram of another method for providing reminders based on voice recognition according to one or more embodiments of the present invention.

Turning now to FIG. 7, a flow diagram of a method 700 for providing reminders based on voice recognition in accordance with an embodiment is shown. As shown at block 702, the method 700 includes monitoring a communication of a user. In exemplary embodiments, the communication of the user can be a face-to-face communication or an electronic communication, such as a phone or video call. Next, as shown at block 704, the method 700 includes determining an identity of a person communicating with the user based on a voice signature of the person. In exemplary embodiments, the determination of the identity of the person is made by querying a voice signature database based on the voice signature of the person. The voice signature database may be stored in the memory of an electronic device of the user and/or on a server in communication with an electronic device of the user. Next as shown at decision block 706, the method 700 includes determining if the user has a reminder set for the person. If the user has a reminder set for the person, the method 700 proceeds to block 708 and provides a notification of the reminder to the user.

In exemplary embodiments, the notification of the reminder may only be provided to the user when one or more additional criteria, which are specified in the reminder event, are met. For example, the additional criteria can include a requirement that the communication be face-to-face in order for the notification to be provided to the user. In addition, the additional criteria can include the absence of other individuals other than the user and the person.

In exemplary embodiments, the additional criteria for the reminder event can include more complex logical operations for determining when to provide a notification. For example, in one embodiment, the notification should only be provided after a sequence of events have occurred.

In one embodiment, multiple reminders may be sequenced such that the user is notified only when they meet the other users in the proper order. For example, a user may set reminders to talk to the teacher and the principal, but they may want to talk to the teacher first before approaching the principal; so if the first user happens to run into the principal first, a reminder will not be triggered because the first user has not spoken to the teacher yet.

In one embodiment, the reminder event can be shared with another person or with a group. For example, one parent can set a reminder to speak with a teacher or coach about their child. The parent that creates the reminder can elect to share the reminder with the other parent of the child. As a result, when either of the parents are detected communicating with the teacher or coach, a reminder will be provided to that parent.

In yet another embodiment, reminder events can be automatically created based on an analyzed conversation with the use of Natural Language Processing (NLP) (e.g., IBM Watson® Natural Language Understanding and Natural Language Classifier API's). For example, a first user having a conversation with a second user says "I'll give your tools back next week." In this case, the electronic device of the first user can be configured to automatically create a reminder event for the first user to return the tools. The reminder event will trigger a notification anytime the voice of the second user is detected after a week from the creation of the event. In another embodiment, if the first user did not specify a time for returning the tools a pre-determined amount of time can be determined based on the job that the tools were borrowed to complete.

In exemplary embodiments, the NLP can also be used to determine if a reminder should be generated in person or on the phone based on what the reminder is for. For example, if the reminder was to tell a co-worker about a new project, that reminder could be done over the phone or in person so the notification could be delivered for either situation. However, if the reminder was to hand over a check, the NLP would recognize that this has to be done in person and not generate the notification if the voice is detected on the phone. The microphone may also hear conversations prior to the meetup of the second person such that a notification could be generated to get the check (e.g., a user may tell a coworker that they are meeting Sam for lunch. The system may hear this and generate a notification for the user to bring the check with them, then another notification will be generated later when Sam's voice is detected.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for providing reminders to users based on voice recognition, comprising:
   a memory having computer readable instructions; and
   a processor for executing the computer readable instructions, the computer readable instructions including:
   monitoring, via a microphone in communication with the processor, a communication of a user;
   determining an identity of a person communicating with the user based on a voice signature of the person;
   providing a notification to the user based on a determination that the user has a reminder event for the person wherein the reminder event includes one or more conditions that must be satisfied in order to provide the notification to the user,
   wherein the one or more conditions are specified by the user and include the user speaking with a second person prior to the communication.

2. The system of claim 1, wherein the computer readable instructions further include determining whether the communication between the user and the person is a face-to-face communication or an electronic communication.

3. The system of claim 2, wherein the reminder event includes a requirement that the communication be face-to-face in order for the notification to be provided to the user and wherein the reminder event includes a reminder for the user to give the person an item.

4. The system of claim 1, wherein determining the identity of the person includes querying a voice signature database based on the voice signature of the person.

5. The system of claim 4, wherein the voice signature database is stored in the memory of an electronic device of the user.

6. The system of claim 4, wherein the voice signature database is stored on a server in communication with an electronic device of the user.

7. The system of claim 1, wherein the one or more conditions include the absence of other individuals other than the user and the person.

8. The system of claim 1, wherein the one or more conditions include at least a minimum percentage of a group of individuals.

9. The system of claim 1, wherein the one or more conditions include a sequence of events defined using one or more logical operations.

10. A method for providing reminders based on voice recognition, the method comprising:
    monitoring, via a microphone of a user device, a communication of a user;
    determining an identity of a person communicating with the user based on a voice signature of the person;
    providing a notification to the user based on a determination that the user has a reminder event for the person, wherein the reminder event includes one or more conditions that must be satisfied in order to provide the notification to the user,
    wherein the one or more conditions are specified by the user and include the user speaking with a second person prior to the communication.

11. The method of claim 10, further comprising determining whether the communication between the user and the person is a face-to-face communication or an electronic communication.

12. The method of claim 11, wherein the reminder event includes a requirement that the communication be face-to-face in order for the notification to be provided to the user and wherein the reminder event includes a reminder for the user to give the person an item.

13. The method of claim 10, wherein determining the identity of the person includes querying a voice signature database based on the voice signature of the person.

14. The method of claim 13, wherein the voice signature database is stored in a memory of the user device.

15. The method of claim 13, wherein the voice signature database is stored on a server in communication with the user device.

16. The method of claim 10, wherein the one or more conditions include the absence of other individuals other than the user and the person.

17. A computer program product comprising a computer readable storage medium having program instructions embodied therewith the program instructions executable by a computer processor to cause the computer processor to perform a method, comprising:
    monitoring, via a microphone of a user device, a communication of a user;
    determining an identity of a person communicating with the user based on a voice signature of the person;
    providing a notification to the user based on a determination that the user has a reminder event for the person, wherein the reminder event includes one or more conditions that must be satisfied in order to provide the notification to the user,
    wherein the one or more conditions are specified by the user and include the user speaking with a second person prior to the communication.

18. The computer program product of claim 17, wherein the method further comprises determining whether the communication between the user and the person is a face-to-face communication or an electronic communication.

* * * * *